Jan. 14, 1936.  S. T. CARUSO  2,027,470
DENTIST'S TOOTH EXTRACTING IMPLEMENT
Filed Jan. 4, 1934  2 Sheets-Sheet 2
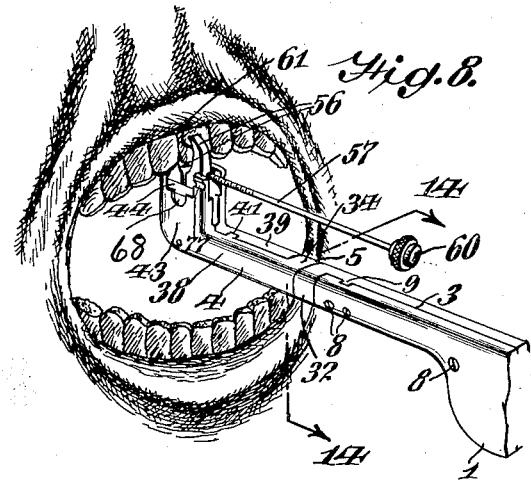
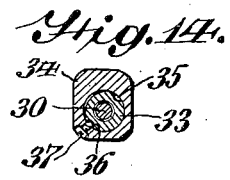
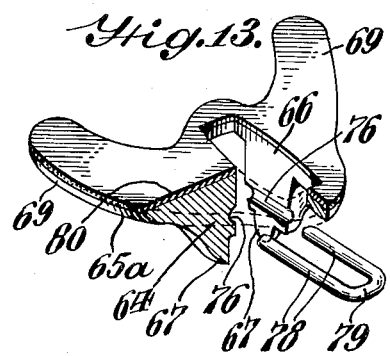
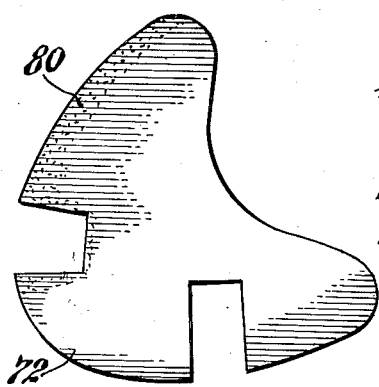
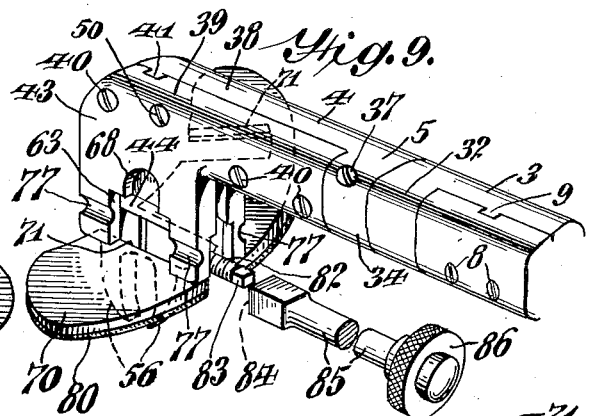
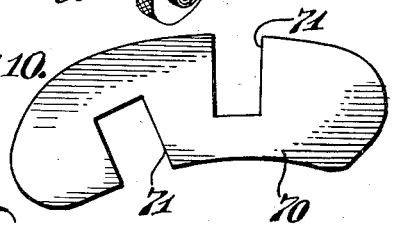
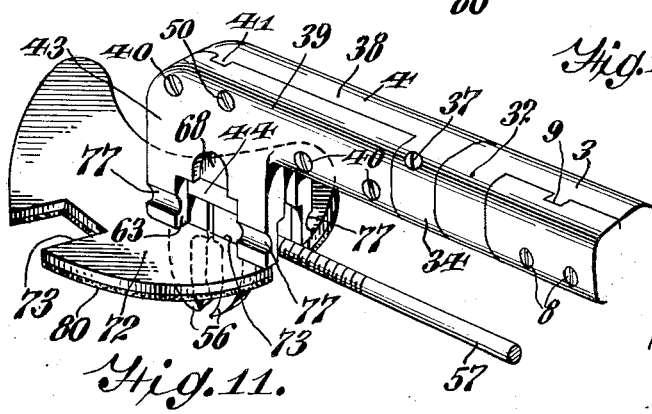
Santi T. Caruso,
INVENTOR
BY Victor J. Evans & Co.
ATTORNEY Patented Jan. 14, 1936

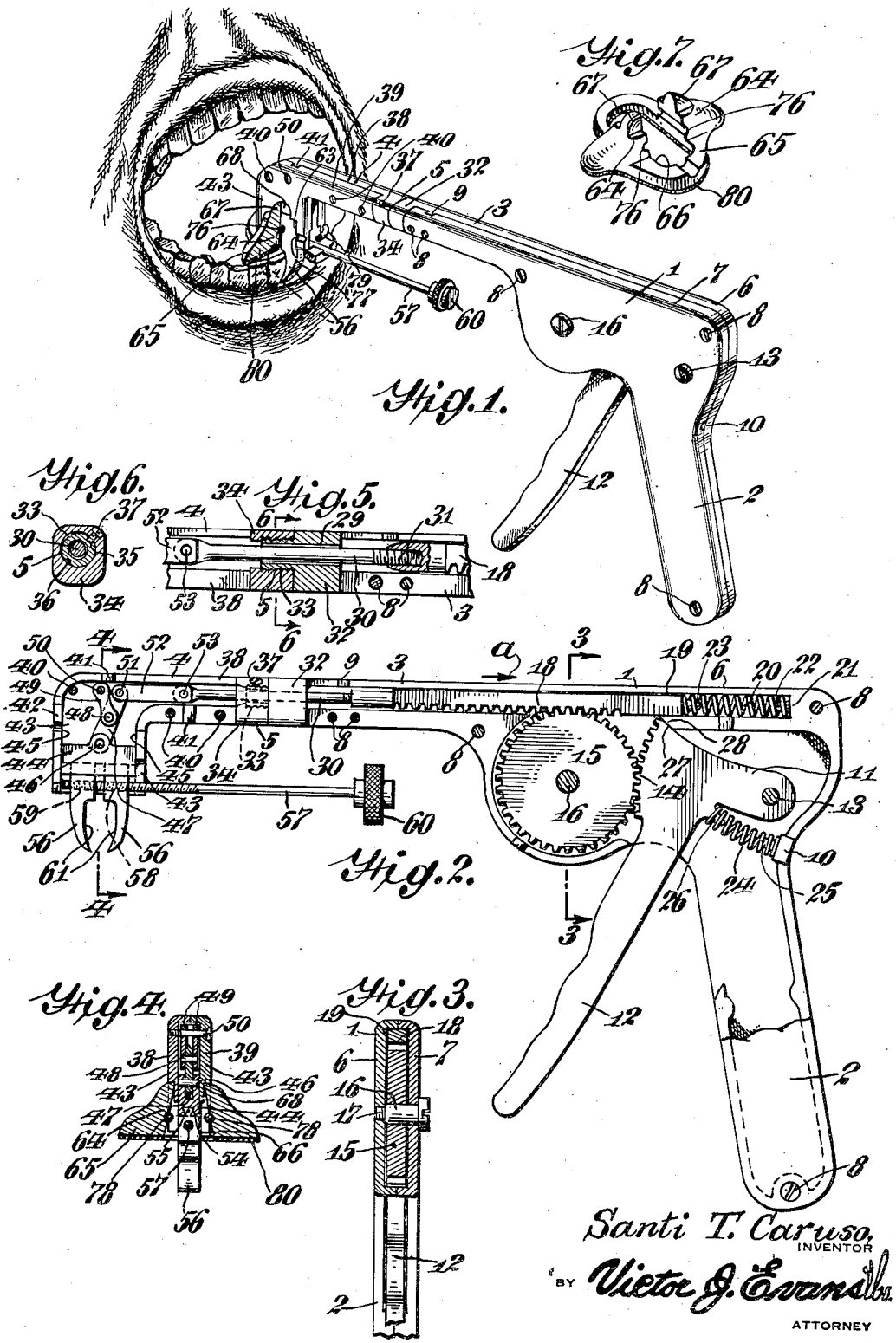

2,027,470

UNITED STATES PATENT OFFICE 2,027,470

DENTIST'S TOOTH EXTRACTING IMPLEMENT

Santi T. Caruso, Ardmore, Pa.

Application January 4, 1934, Serial No. 705,272

10 Claims. (Cl. 32—61)

This invention relates to an improved implement for extracting teeth, and while it is well known that tooth extraction is best accomplished at the wrist due to imparting the proper twist to the tooth to free it from the jaw bone prior to the extraction movement, there are many teeth that break, and oftentimes below the gum, which necessitates going back for the remaining portion of the tooth.

With the present invention it is the purpose to impart to the tooth an extraction movement primarily, there hardly being at any time the necessity of a twist, though an infinitesimal twist may be required with some teeth, thereby avoiding or at least reducing to a minimum the possibility of breaking the tooth. Therefore it is the purpose to provide an improved tooth extracting implement wherein a trigger may be manually actuated by the hand and thereby imparting an extraction movement to grip the jaws of the implement, an extraction movement upward or straight downward, and for the most times without a twist.

Another purpose is to provide in an implement of this character means to span certain of the teeth, for resisting the upward or downward pull on the tooth to be extracted, for the purpose of expediting the extraction of the tooth.

Very often there are no teeth on either side of the tooth to be extracted, there may be some on one side and none on the other side for some distance, and in this event it is the purpose to provide means to span these gaps, thereby facilitating the pulling of the tooth to be extracted.

Another purpose is to provide, in an implement of this character means to permit the end of the implement to be turned downwardly or upwardly for the purpose of extracting upper or lower teeth, and moreover to provide means for adjusting the extracting gripping jaws.

A further purpose is to provide an implement including means to permit extracting gripping jaws of different sizes to be used, according to the size of the tooth to be extracted.

A still further purpose is to provide, in an implement of this kind means to be detachably connected to the extracting end of the implement for spanning the gap between teeth, when extracting the tooth to be pulled, or plates to be inserted in the mouth on which the end of the implement may rest.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:

Figure 1 is a view in perspective illustrating the tooth pulling instrument in position for extracting one of the front teeth of a lower jaw of a mouth.

Figure 2 is a view in elevation showing two plates of the instrument removed for the purpose of illustrating the interior structure of the instrument.

Figure 3 is a sectional view on line 3—3 of Figure 2 showing the trigger operated gear and rack.

Figure 4 is a sectional view on line 4—4 of Figure 2, illustrating the construction and mounting of the tooth gripping jaws of the instrument.

Figure 5 is a fragmentary view of the barrel end of the instrument showing parts in elevation and parts in section.

Figure 6 is a sectional view on line 6—6 of Figure 5.

Figure 7 is a detail perspective view of a plate for detachable engagement with a turned down end of the barrel of the instrument, said rest plate adapted to span and rest upon two teeth, one immediately on each side and adjacent the tooth to be extracted, thereby acting to resist the pull of the extracting gripping jaws of the instrument.

Figure 8 is a perspective view of the barrel portion of the instrument, with the end section of the barrel inverted for extracting a tooth from the upper jaw of a mouth.

Figure 9 is a perspective view of the end portion of the barrel of the instrument illustrating a right angle end portion of a swiveled section of the barrel engaging a flat plate with the gripping extracting jaws engaged through a slot in the plate, which plate is adapted to span a substantial space between the remaining teeth, and from which space teeth having been previously extracted, the plate acting as a resistance to the pull imparted upon the extracting gripping jaws.

Figure 10 is a plan view of the plate shown in Figure 9.

Figure 11 is a perspective view similar to that in Figure 9, illustrating a slightly modified design of plate.

Figure 12 is a plan view of the plate shown in Figure 11.

Figure 13 is a perspective view of a different form of plate, which has opposed projections on opposite sides of a slot in the plate through which the extracting gripping jaws engage, said projections acting to straddle the right angle end of the swiveled section of the barrel of the instrument.

Figure 14 is a sectional view on line 14—14 of Figure 8 showing a screw for retaining the swiveled section of the barrel in an inverted position as in Figure 8.

With reference to the drawings 1 identifies the body of the instrument including a handle 2, a barrel portion 3, which in turn has a swiveled end section 4 provided with a swivel joint at 5 to the fixed portion of the barrel. This body of the instrument including the elements 1, 2, and 3 is composed of opposite plates 6 and 7, which are fastened together by screws 8. The adjacent engaging faces of said plates 6 and 7 are provided with groove and rib joints at 9 and 10 to retain the two plates 6 and 7 in registration, until the screws 8 are turned home.

The adjacent engaging faces of the plates 6 and 7 are chambered out for housing the body portion 11 of a trigger 12, said body portion being pivoted on the shank of a screw 13. This body portion has an arcuate toothed edge 14 which meshes with the teeth of a gear 15 rotatable on the shank of a screw 16, the reduced extremity 17 of the screw 16 being threaded into the plate 6. By this construction it is possible to rock the trigger 12 in a direction toward the handle and thereby rock the gear 15. A rack 18 is slidably mounted in longitudinal channels 19 of the adjacent faces of the two plates 6 and 7, and is urged forwardly by a spring 20 which is interposed between one end of the rack and an end wall 21 of the channels. The end wall of one of the channels and the end of the rack 18 have lugs 22 and 23 to retain the spring 20 in position. The rack 18 in turn meshes with the gear 15, so that when the trigger 12 is operated toward the handle 2, the gear 15 will operate the rack in the direction of the arrow against the action of the spring 20. To insure such action of the trigger a second spring 24 engages with lugs 25 and 26 integrally connected to the wall of the chambered out portion of one of the plates 6 and 7 and formed on the edge of the trigger 12. When the trigger 12 is operated toward the handle 2, the spring 24 resists this action, in order to insure returning the trigger to its normal position, with the edge 27 of the body of the trigger engaged against a stop 28. However either one of the springs can be eliminated if desired.

The barrel 3 has a guide 29 through which a rod 30 is guided. One end of the rod 30 is threaded at 31 into the end of the rack 18. A lateral portion 32 of the end of the barrel 3 and through which the guide 29 is formed is provided with a reduced threaded extension 33, which threads into a lateral portion 34 of the swiveled end section 4 of the barrel. When joining the swiveled end section of the barrel to the barrel 3 of the instrument, the rod 30 threads into the rack 18 at the same time as the extension 33 threads into the lateral portion 34 of the swiveled end section of the barrel. It is possible to invert the swiveled end section for a purpose to be hereinafter set forth, and to accomplish this inversion of the end section, it is only necessary to rotate the end section 4 one half turn, the joint 5 permitting this operation. The threaded extension 33 is provided with diametrically opposite depressions 35 and 36. Threaded to the offset or lateral portion 34 at the corner thereof is a screw 37, the purpose of which is to retain the swiveled end section of the instrument in either of its positions, by causing the end of the screw 37 to engage in one or the other of the depressions 35 and 36.

The swiveled end section 4 of the instrument also comprises opposed plates 38 and 39, the latter being fastened to the former by screws 40. The adjacent faces of these plates 38 and 39 are also chambered out and have groove and rib joints 41 and 42, to insure holding the two plates in registration until the fastening screws 40 are inserted and turned home.

The plates 38 and 39 at their extremities terminate in lateral opposed guide walls 43, which are spaced. A slide block 44 is mounted for sliding movement between the guides 45 of the walls 43, and connected pivotally at 46 to the block is a link 47. This link 47 is in turn pivoted at 48 to a link 49, which is pivotally mounted upon a stationary screw pin 50 as shown in Figures 1 and 2. The link 47 is also in turn pivoted at 51 to a link 52 which is pivoted at 53 to the end of the rod 30. It is obvious that when the trigger 12 is operated toward the handle and movement imparted to the rack 18, the rack will pull upon the rod 30, and through the medium of the links the slide block 44 may freely slide between the guides 45. When the link 52 is moved in the direction of the rod 30, it not only tilts the link 47 in the same direction, but it also moves the pivot 48 toward the link 52 and rearwardly. One face of the slide block 44 has a dove tail groove 54, receiving similarly shaped ribs 55 carried by the extracting gripping jaws 56. The extracting gripping jaws are therefore capable of sliding movement in the dove tail groove 54, and also can be removed from the grooves for the insertion of other jaws (not shown).

A rod 57 for adjusting the extracting gripping jaws is provided. One end of this rod has right and left threads 58 and 59 with which the extracting gripping jaws are threadingly engaged, therefore by rotating the rod 57 in either direction through the medium of the knurled head 60 the extracting gripping jaws may be moved toward and from each other, for gripping the tooth or releasing the same. The jaws 56 have their adjacent faces recessed at 61, said recesses being of such shape as may conform to the contour of the various teeth. In other words one set of jaws may have their recessed faces of such construction as will better grip the molar or jaw teeth, another set may have their recessed faces of such contour and shape as to grip the eye teeth, and another set better suitable for gripping the front, upper and lower teeth. These gripping faces may be modified according to requirements, therefore a multiple of sets of jaws may be included with each instrument.

The walls 43 are bifurcated as shown at 63, and to engage therewith are opposed enlargements or projections 64 of a plate 65, it being obvious that the extracting gripping jaws when the plate 65 is applied pass through an opening 66 of the plate, in order that the gripping jaws may engage with a tooth. The enlargements or projections 64 have extensions 67, which engage in recesses 68 of the outer faces of the walls 43. In this manner the plate 65 is held in position. The plate 65 in Figure 7 of the drawings is particularly adapted to rest upon at least two of the remaining teeth on each side of the tooth to be extracted, while the end edges of the walls 43 in turn rest upon the plate. The plate is for the purpose of resisting the pull or extracting movement of the gripping jaws, when the trigger 12 is operated to create an extracting action on the gripping jaws 56.

A similar plate to that in Figure 7 is disclosed in Figure 13, and the reference characters used to identify the parts of the plate 65 identify similar parts of the plate 65a in Figure 13. However the plate 65a in Figure 13 has extension tongues 69, which are curved to conform to the outline of the arrangement of the teeth. By means of these extension tongues it is possible for the plate 65a to span a substantial gap between certain of the remaining teeth.

In Figures 9 and 10 there is disclosed a plate 70 provided with slots 71. These slots are of such width and sizes as to permit the gripping jaws to pass therethrough, while the end edges of the walls 43 can rest upon the plate, in order to provide resistance for the extracting or pulling action of the gripping jaws. This plate 70 can span a plurality of the remaining teeth on each side of the tooth being extracted. In Figures 11 and 12 a similar flat plate 72 is provided, its slots or notches 73 acting to function the same as the slots or notches 71 of the plate 70. The plate 72 is practically the same as that in Figures 9 and 10, excepting that it is slightly modified in shape, making it possible to span the teeth from one side of the jaw to the other.

When using either one of the plates 65 or 65a it is necessary to retain them in position, and to accomplish this the adjacent faces of the enlargements or projections 64 and the remote exterior faces of the walls 43 have grooves or key-ways 76 and 77 for the reception of the arms 78 of the U shaped key 79. It is possible to easily withdraw the key to allow either one of the plates to be detached.

The surface of the plates 65 and 65a which is nearest the teeth, when either one of the plates is used is faced with a relatively thin thickness of rubber 80. This facing of rubber is vulcanized or otherwise suitably fastened to said plates and is designed for the purpose of preventing the metal from contacting with and injuring the enamel on the teeth. The plates 70 and 72 each have one of their surfaces faced with a thin layer of rubber 80 vulcanized thereto, to likewise avoid injury to the enamel of the teeth.

In addition to the plates 70 and 72 functioning to resist the pull exerted on the opposed jaws 56, the plates 70 and 72 serve to build up a surface, against which the end edges of the walls 43 may bear when extracting teeth. For example some teeth project a shorter distance from the gums than others, and due to the fact that the extracting gripping jaws have a maximum degree of movement beyond the end edges of the walls 43 it may be necessary to use two plates 70, one on top of the other or possibly three, or to use two or three plates 72 for the purpose of building up the resistance resting surface for the end edges of the walls 43, and at the same time preventing the extracting gripping jaws from engaging too far into the gums. It is obvious that it is also possible to use the plates 70 and 72 in conjunction with either one of the plates 65 or 65a.

In Figure 9 the right and left threaded screw 82 terminates in a square end 83 which enters a similarly shaped socket 84 in one end of a key 85. By means of this key having its head 86 it is possible to engage the socket 84 with the rectangular end of the screw 82, and thereby adjust the extracting gripping jaws into suitable gripping position on the tooth to be extracted, and then remove the key 85.

The invention having been set forth, what is claimed is:

1. In a tooth extracting instrument, an instrument body including a barrel portion and a handle portion, the barrel portion terminating in lateral guides, a slide operative in the guides, extracting gripping jaws operatively carried by the slide, means for adjusting the jaws toward and from each other for gripping and releasing a tooth, and means associated with the handle and the barrel and operatively connected to the slide for moving the latter for urging an extracting action on the jaws, said barrel having a swiveled end section, the terminal of which carries the guides for the slide, the swiveled end section adapted to be adjusted swivelly for positioning the gripping jaws downwardly or upwardly for extracting lower or upper teeth, and means for holding the swivel end section in its adjusted positions.

2. In a tooth extracting instrument, an instrument body including a barrel portion and a handle portion, the barrel portion terminating in lateral guides, a slide operative in the guides, extracting gripping jaws detachably and operatively carried by the slide, means for adjusting the jaws toward and from each other for gripping and releasing a tooth, and means associated with the handle and the body and barrel and operatively connected to the slide for moving the latter for urging an extracting action on the jaws, and means for permitting the jaws to be detached from the slide, said slide moving means comprising a rack, a gear meshing with the rack, a trigger pivoted in the handle end and having an arcuate rack engagement with said gear for imparting a rocking movement thereto, and spring means for the rack to resist its movement.

3. In a tooth extracting instrument, an instrument body including a barrel portion and a handle portion, the barrel portion terminating in lateral guides, a slide operative in the guides, extracting gripping jaws operatively carried by the slide, means for adjusting the jaws toward and from each other for gripping and releasing a tooth, and means associated with the handle and the barrel and operatively connected to the slide for moving the latter for urging an extracting action on the jaws, said barrel having a swiveled end section, the terminal of which carries the guides for the slide, the swiveled end section adapted to be adjusted swivelly for positioning the gripping jaws downwardly or upwardly for extracting lower or upper teeth, and means for holding the swivel end section in its two different positions, said slide moving means comprising a rack, a gear meshing with the rack, a trigger pivoted in the handle end and having an arcuate rack engagement with said gear for imparting a rocking movement thereto, and spring means for the rack to resist its movement.

4. In a tooth extracting instrument, an instrument body including a barrel portion and a handle portion, the barrel portion terminating in lateral guides, a slide operative in the guides, extracting gripping jaws operatively carried by the slide, means for adjusting the jaws toward and from each other for gripping and releasing a tooth, and means associated with the handle and the barrel and operatively connected to the slide for moving the latter for in turn urging an extracting action on the jaws, and removable means to rest or engage upon the teeth and with which the end edges of the guides engage for resisting the pull of the extracting gripping jaws.

5. In a tooth extracting instrument, an instrument body including a barrel portion and a handle portion, said barrel portion having a swiveled end section terminating at one end in a head provided with lateral guides, a slide operative in said guides, extracting gripping jaws operatively carried by the slide, means for adjusting the jaws toward and from each other for gripping and releasing a tooth, and means associated with the handle and the barrel and operatively connected to the slide for moving the latter for urging an extracting action on the jaws.

6. In a tooth extracting instrument, an instrument body including a barrel portion and a handle portion, said barrel portion having a swiveled end section terminating at one end in a head provided with lateral guides, a slide operative in said guides, extracting gripping jaws operatively carried by the slide, means for adjusting the jaws toward and from each other for gripping and releasing a tooth, and means associated with the handle and the barrel and operatively connected to the slide for moving the latter for in turn urging an extracting action on the jaws, and means for permitting the extracting gripping jaws to be detached from the slide, said swiveled end section adapted to be adjusted swivelly for positioning the gripping jaws downwardly or upwardly for extracting lower or upper teeth, and means for holding the swiveled end section in its two different positions.

7. A tooth extracting instrument comprising an instrument body including a barrel portion and a handle portion, a yieldably mounted bar in the movable barrel portion, an end of the barrel portion having a head, a slide movably guided between the walls of the head, extracting gripping jaws movable toward and from each other and carried by the slide, isosceles triangle link connection operatively connected to the end of the bar and in turn connected to the slide, and means possessing substantial leverage mounted in the handle portion and operatively connecting to the bar for reciprocating the same, thereby imparting movement to said triangle link connection for reciprocating the slide, hence imparting an extracting action to the jaws for extracting a tooth.

8. A tooth extracting instrument comprising an instrument body including a barrel portion and a handle portion, a yieldably mounted bar in the movable barrel portion, an end of the barrel portion having a head, a slide movably guided between the walls of the head, extracting gripping jaws movable toward and from each other and carried by the slide, isosceles triangle link connection operatively connected to the end of the bar and in turn connected to the slide, and means possessing substantial leverage mounted in the handle portion and operatively connected to the bar for reciprocating the same, thereby imparting movement to said triangle link connection for reciprocating the slide, hence imparting an extracting action to the jaws for extracting a tooth, and means to be detachably carried by the head and adapted to bear on teeth other than the tooth to be extracted for facilitating the extracting of the latter.

9. A tooth extracting instrument comprising an instrument body including a barrel portion and a handle portion, said barrel portion having a movable end section, a yieldably mounted bar in the barrel portion, a head on the movable end section, a slide movably guided between the walls of the head, extracting gripping jaws movable toward and from each other and carried by the slide, isosceles triangle link connection operatively connected to the end of the bar and in turn connected to the slide, and means mounted in the handle portion and operatively connected to the bar for reciprocating the same, thereby imparting movement to said triangle link connection for reciprocating the slide, hence imparting action to the jaws for extracting a tooth, and means to be detachably carried by the head and adapted to bear on the remainder of the teeth on each side of the tooth to be extracted for facilitating the extracting of said tooth, said end section and the means connecting the triangle link connections with said bar being swiveled, whereby the head may be turned upwardly or downwardly for likewise positioning the gripping jaws for extracting the upper or lower teeth, and means for holding said end section in its two swiveled positions.

10. A tooth extracting instrument, comprising an instrument body having a barrel portion and a handle portion, a bar mounted for reciprocation in the barrel portion, the end of the bar portion having a hollow lateral head, an element mounted for reciprocating movements in said head and carrying extracting gripping jaws movable toward and from each other for gripping and releasing a tooth to be extracted, an isosceles triangle means supporting said element in and to impart reciprocating movements to the element for insuring extracting movements to the jaws, means connecting the isosceles triangle means to said bar and means possessing substantial leverage mounted in the handle portion and operatively connecting with said bar for imparting a reciprocating action thereto for actuating said isosceles triangle means and in turn said element.

SANTI T. CARUSO.